(12) United States Patent
Wylde et al.

(10) Patent No.: US 9,127,847 B2
(45) Date of Patent: Sep. 8, 2015

(54) MULTI-BURNER HIGH-PRESSURE PORTABLE STOVE HAVING INDEPENDENTLY CONTROLLED REGULATORS

(71) Applicants: Stevenson Bert Wylde, Belvidere, IL (US); Paul R Wade, Kenosha, WI (US)

(72) Inventors: Stevenson Bert Wylde, Belvidere, IL (US); Paul R Wade, Kenosha, WI (US)

(73) Assignee: Akerue Industries, LLC, Antioch, IL (US)

( * ) Notice: Subject to any disclaimer, the term of this patent is extended or adjusted under 35 U.S.C. 154(b) by 394 days.

(21) Appl. No.: 13/681,708

(22) Filed: Nov. 20, 2012

(65) Prior Publication Data

US 2014/0137850 A1    May 22, 2014

(51) Int. Cl.
*F24C 3/14* (2006.01)
*F24C 3/12* (2006.01)

(52) U.S. Cl.
CPC . *F24C 3/14* (2013.01); *F24C 3/126* (2013.01); *Y02B 40/166* (2013.01)

(58) Field of Classification Search
CPC .......... F24C 3/14; F24C 3/126; Y02B 40/166
See application file for complete search history.

(56) References Cited

U.S. PATENT DOCUMENTS

| | | | | |
|---|---|---|---|---|
| 3,590,860 | A * | 7/1971 | Stenner | 137/495 |
| 4,426,990 | A * | 1/1984 | Shepherd | 126/9 B |
| 7,367,332 | B2 * | 5/2008 | Mosher et al. | 126/9 R |

* cited by examiner

Primary Examiner — Alfred Basichas
(74) Attorney, Agent, or Firm — Justin Lampel

(57) ABSTRACT

A multi-burner high-pressure portable stove having independently regulated burners is provided. The stove is especially suitable for camping. The stove provides similar functionality as a typical kitchen range by allowing a user to efficiently control the amount of fuel utilized by each individual burner of the stove. The stove further allows the user to independently control varying flame amounts of each burner so as a user may select between, simmer, medium, high or anything in-between for each burner. The regulators have a dual-lead stem thread knob which allows for quick and easy adjustments. The regulators are safely secured within a housing of the stove. In an embodiment, the regulators may be located outside the housing of the stove.

8 Claims, 7 Drawing Sheets

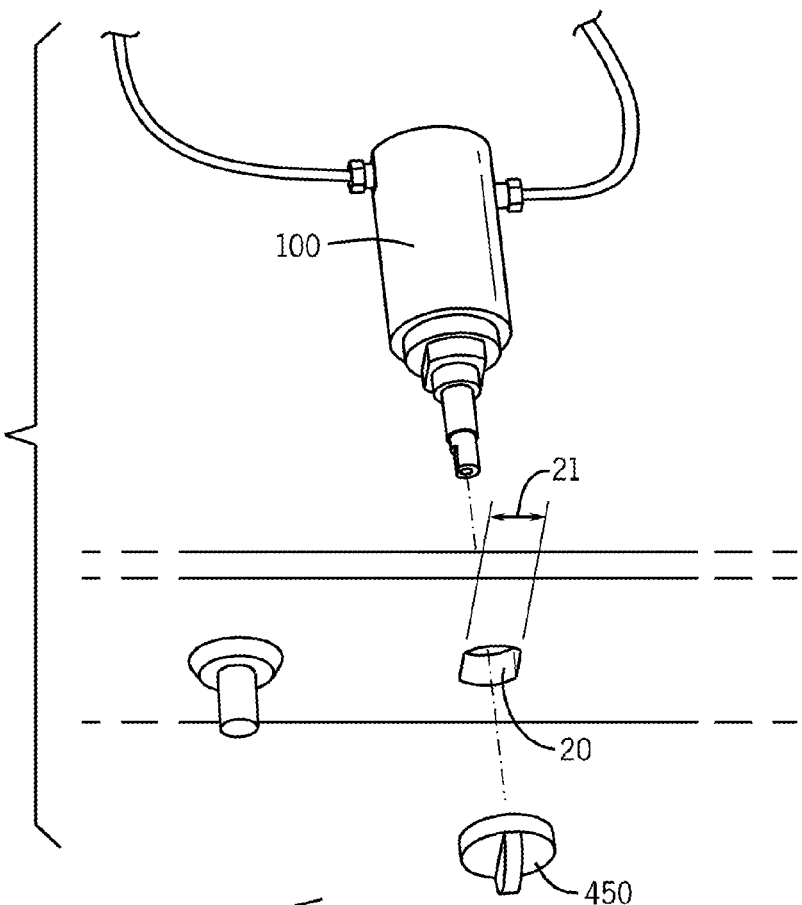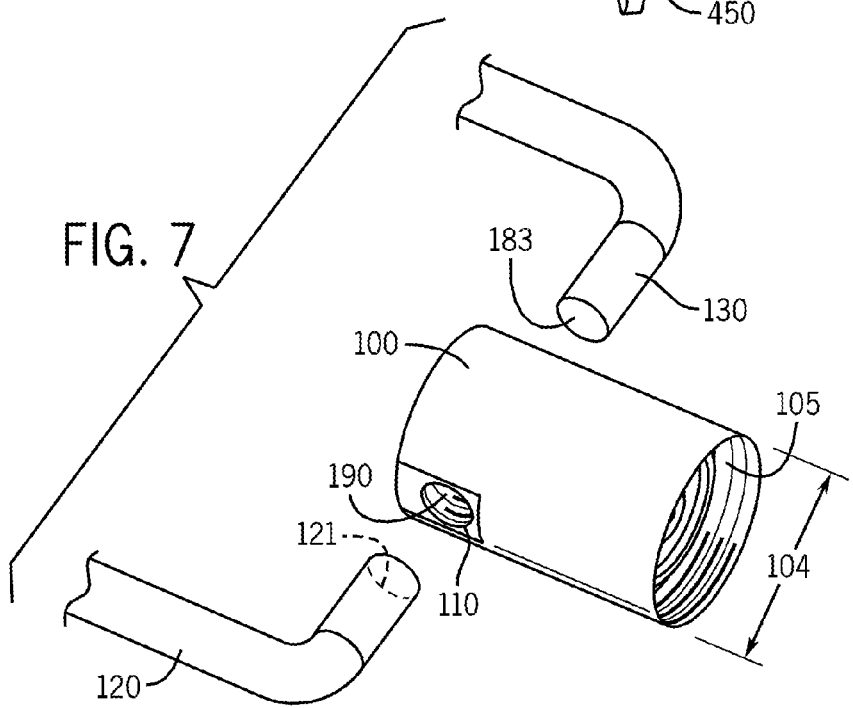

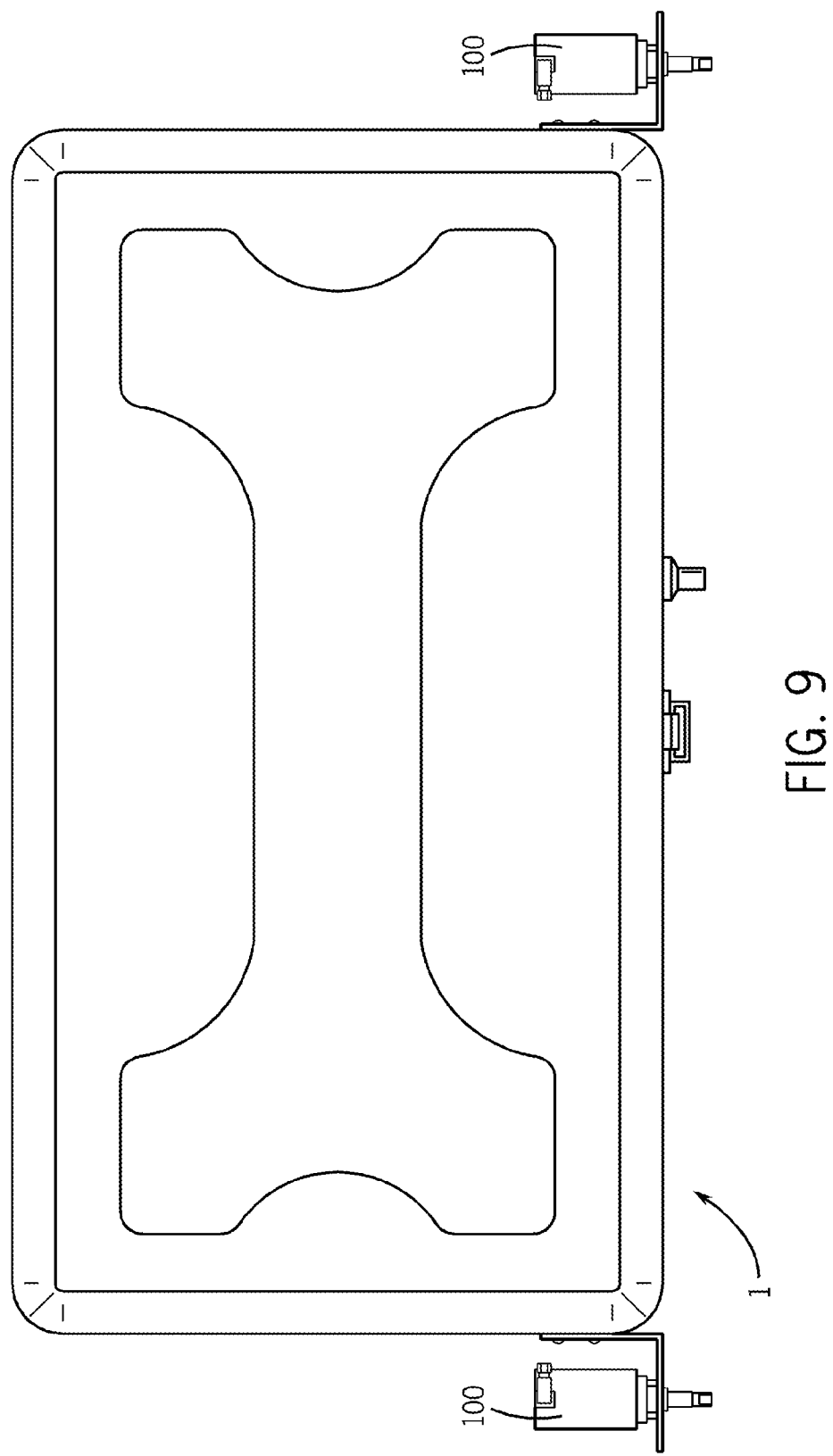

MULTI-BURNER HIGH-PRESSURE PORTABLE STOVE HAVING INDEPENDENTLY CONTROLLED REGULATORS

CROSS REFERENCE TO RELATED APPLICATIONS

The present application is based on U.S. provisional application No. 61/562,581 filed on Nov. 22, 2011, the entire contents of which are incorporated by reference. Applicant claims the priority benefit of the application Ser. No. 61/562,581 application.

BACKGROUND OF THE INVENTION

A multi-burner high-pressure portable stove having independently regulated burners is provided. The stove is especially suitable for camping. The stove provides similar functionality as a typical kitchen range by allowing a user to efficiently control the amount of fuel utilized by each individual burner of the stove. The stove further allows the user to independently control varying flame amounts of each burner so as a user may select between, simmer, medium, high or anything in-between for each burner. The regulators have a dual-lead stem thread knob which allows for quick and easy adjustments. The regulators are safely secured within a housing of the stove. In an embodiment, the regulators may be located outside the housing of the stove.

Every year millions of people enjoy camping, tailgating and other activities while using a portable stove. It is almost impossible to attend professional or major college sporting event without seeing thousands of people utilizing small mobile grills to cook hamburgers, brats or other grilled favorites.

Attempts have been made to provide improved portable stoves. For example, U.S. Pat. No. 7,367,332 to Mosher II discloses a folding camping stove. The folding camping stove may be formed in a clamshell configuration, having two clamshells that fold outward to expose at least two cooking surfaces. Two pivot points are provided on the folding camping stove. Each of the clamshells folds about a separate pivot point. Fuel trains for the clamshells are positioned at the pivot points. A regulator and manifold assembly is provided for providing gas from a canister to the folding stove. The manifold splits the gas coming from the regulator and directs it to opposite sides of the folding stove. Each of the clamshells includes a cooking grate. The cooking grates appear symmetrical from a top view, but are slightly offset relative to one another so that the clamshells may be folded inward relative to each other and the grates may nest together.

Further, U.S. Pat. No. 6,369,366 to Mullen discloses a combination electric cooking apparatus capable of being selectively operated by either a D.C. or A.C. electrical power source for cooking a variety of foods. The apparatus includes a pair of hinged pan-shaped housing members which can be pivoted between a closed position superposed one above the other in opposed facing relation and an open position laterally adjacent one another. A heating plate is carried by each housing member and each plate has a central recessed flat surface surrounded by a raised side wall and a D.C. and an A.C. heating element secured to its underside, each heating element individually controlled by a separate thermostat. In the closed position, the recessed flat surfaces and raised side walls form a central cavity. In the open position, the recessed flat surface and side wall of each plate serve as a mounting surface to receive cooking vessels having mating bottoms. D.C. power may be supplied by an auxiliary battery, a vehicle battery, or a battery charger. Another aspect of the invention is a D.C. electric cooking system for vehicles and boats which are provided with an auxiliary heavy duty D.C. electrical circuit and receptacle for powering the cooker and other high wattage D.C. appliances.

However, these stoves fail to provide a high-pressure portable stove having independently controlled regulators controlling multiple burners. Further, these patents fail to disclose a high-pressure portable stove having dual lead stem regulators. In an embodiment, the portable stove has the regulators protected within an internal housing of the portable stove, and in an alternative embodiment, the regulators are located outside the internal housing.

SUMMARY OF THE INVENTION

A multi-burner high-pressure portable stove having independently regulated burners is provided. The portable stove provides similar functionality as a typical kitchen range by allowing a user to efficiently control the amount of fuel utilized by each individual burner of the stove. The stove further allows the user to independently control varying flame amounts of each burner so as a user may select between, simmer, medium, high or anything in-between for each burner. The regulators have a dual-lead stem thread knob which allows for quick and easy adjustments. In an embodiment, the regulators may be located outside the housing of the stove.

Traditional portable stoves have a single external regulator which controls the pressure of the fuel. Further, traditional portable stoves have internal needle valves for each burner which control the flow of the fuel to the burners. These stoves regulate the fuel away from the stove and before the fuel flows to the manifold wherein the needle generally only allows the user to set the burner to 'on' or 'off' (as opposed to regulating the pressure and flow of fuel to the burner). As a result, these traditional portable stoves are inaccurate and have poor fuel efficiency. Further, they do not allow a user to accurately adjust the flow of fuel independently to different burners.

In the present portable stove, the fuel (usually propane) is allowed to move from a filtered connector to the manifold as regulated or unregulated pressure wherein the pressure of the fuel is then controlled simultaneously with the flow by independently controlled regulators located within the interior of a housing of the present portable stove.

An advantage of the present stove is that the user may heat or cook multiple food items at varying temperatures on the same portable stove.

A further advantage of the present stove is that in an embodiment the regulators of the stove are protected within the housing of the stove.

And an advantage of the present stove is that in an embodiment the regulators of the stove may be located outside the housing of the stove.

Yet another advantage of the present stove is that the independently controlled regulators of the device will provide increased adjustability for each burner.

Still another advantage of the present stove is to provide users with a high-pressure propane grill/stove having the same functionality as low pressure multi-burner stoves normally found on a kitchen range or backyard gas grill.

Yet another advantage of the present stove is that the present stove has a dual-lead stem thread regulator that allows a user to easily and quickly adjust the flame exiting the burner.

Still another advantage of the present stove is that the present portable stove utilizes high-pressure fuel for a portable tailgating stove environment (which is better for dealing with wind and other environmental consideration) as opposed to a low-pressure.

And another advantage of the present stove is that the present stove has virtually infinite adjustability with respect to each of the multiple burners so a user may select between simmer, medium, high and anything in-between.

An advantage of the present stove is that in an embodiment, the present stove lacks any fragile external parts which would normally break on inexpensive existing stoves.

Yet another advantage of the present stove is that the control knob of the present stove allows for controlling the pressure and flow of the fuel simultaneously; as opposed to other portable stoves wherein an external regulator controls the pressure and a needle valve controls the flow for the fuel.

Still another advantage of the present portable stove is to provide a portable stove which has increase fuel efficiency over existing portable stoves.

For a more complete understanding of the above listed features and advantages of the present independently regulated portable stove regulators reference should be made to the following detailed description of the preferred embodiments. Further, additional features and advantages of the invention are described in, and will be apparent from, the detailed description of the preferred embodiments.

BRIEF DESCRIPTION OF THE DRAWINGS

FIG. 6 illustrates a regulator of the present portable stove wherein the regulator is located within the housing of the portable stove.

FIG. 7 illustrates an exploded view of the regulator of the portable stove.

FIG. 9 illustrates an alternative embodiment of the portable stove wherein the regulators are located outside of the housing of the portable stove.

DETAILED DESCRIPTION OF THE PREFERRED EMBODIMENTS

A multi-burner high-pressure portable stove having independently regulated burners is provided. The portable stove provides similar functionality as a typical kitchen range by allowing a user to efficiently control the amount of fuel utilized by each individual burner of the stove. The stove further allows the user to independently control varying flame amounts of each burner so as a user may select between, simmer, medium, high or anything in-between for each burner. The regulators have a dual-lead stem thread knob which allows for quick and easy adjustments. The regulators are safely secured within a housing of the stove. In an embodiment, the regulators may be located outside the housing of the stove.

Figure 1:
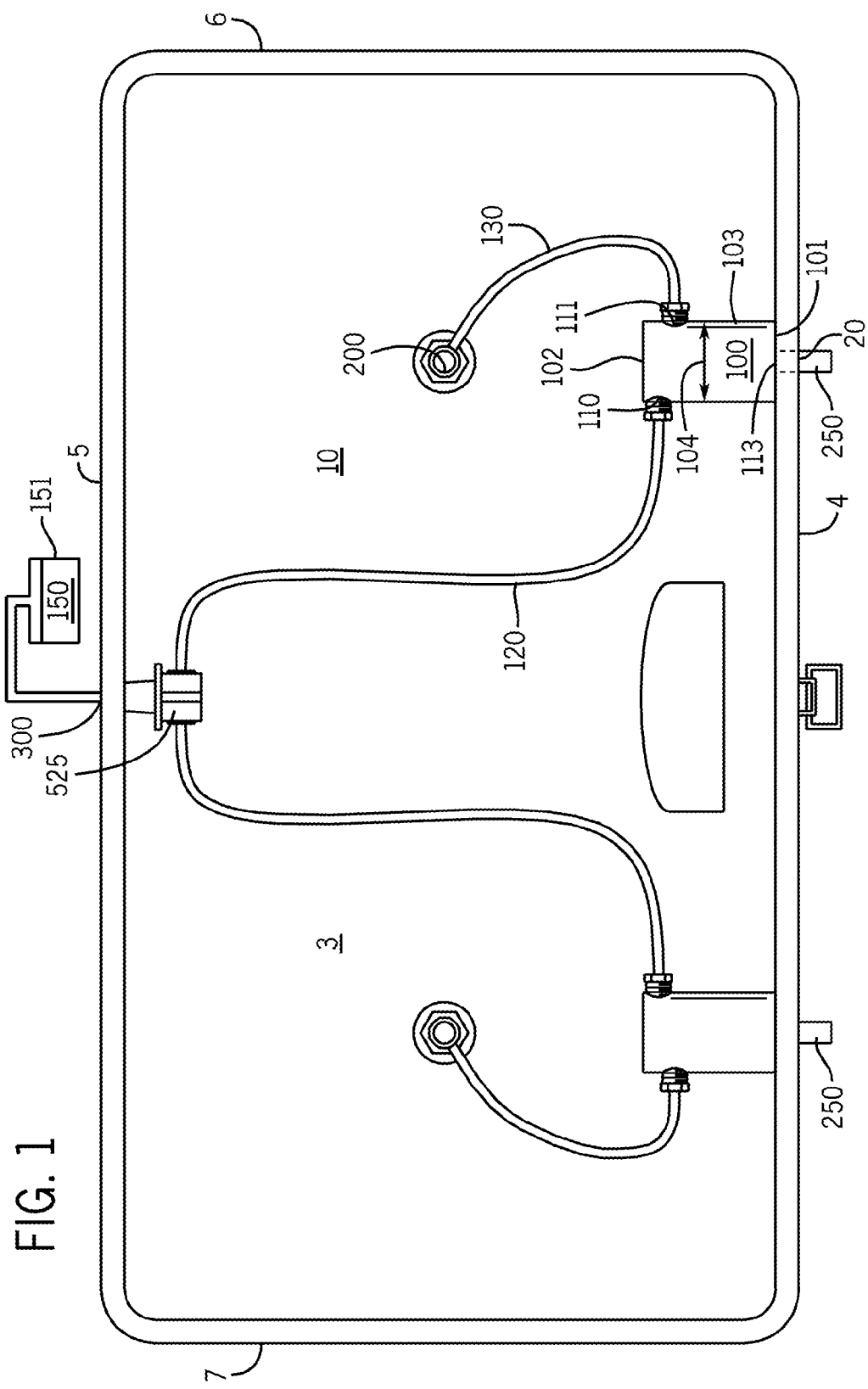
FIG. 1 illustrates a plan view of the interior of the portable stove wherein the burners are removed.

Referring now to the drawings wherein like numbers refer to like parts, FIG. 1 generally illustrates a portion of a portable stove 1. The portable stove 1 may move from a usable First Position A (FIG. 2) to a closed non-usable Second Position B (FIG. 3). In the First Position A, the portable stove 1 may be used to cook food. In the Second Position B, the portable stove 1 is in the non-usable position wherein the portable stove 1 may be transported and/or stored.

The portable stove 1 is predominately made of various metals so as to be sturdy and so as to withstand the high temperatures associated with cooking. Preferably, the portable stove 1 is rectangular in shape and large enough so as to allow for multiple pot ranges for cooking food items (see below).

The present stove 1 provides users with a high-pressure propane portable stove, favored by campers and tailgaters, having the same functionality as normally found in multi-burner stoves located in kitchens or backyard gas grill (which are typically low pressure). The portable stove 1 may have an open top 2 (which may be covered as described below), a bottom 3, a front 4, a back 5, a first side 6, a second side 7 and an interior 10. The portable stove 1 is preferably lightweight and capable of being hand carried and suitable to use, for example, while camping or tailgating.

A stove tray 74 (FIG. 2) is placed on the open top 2 of the stove 1. The stove tray 74 may be shaped substantially similar to the open top 2 of the device 1. The stove tray 74 may protect the structures located within the interior 10 of the portable stove 1. The stove tray 74 may prevent grease or other articles from falling into the interior 10 of the portable stove 1 and damaging regulators 100 or other components of the device 1. The stove tray 74 is easily removed from the open top 2 of the device 1 for cleaning and/or replacement. The stove tray 74 has a plurality of openings (not shown). The plurality of openings allow tubes (not shown) to pass through the stove tray 74 to directly connect to burners 88 which in turn heat a pot or other cooking device located on a stove grill 637.

As stated above, the portable stove 1 may have a stove grill 637 (FIG. 2) which may be located above the stove tray 74. Whereas the stove tray 74 generally lacks openings (except for the openings for the burners 88); the stove grill 637 may be generally an open surface. More specifically, the stove grill 637 may resemble grills of typical stoves in that the present stove grill 637 is preferably a metal grid on which the user directly places the article to be cooked. The stove grill 637 is generally open allowing for the heat from the burners 88 to reach the food articles being cooked. More specifically, the stove grill 637 may provide a surface for a user to place a pot or other cooking device on while the device 1 is being used. The stove grill 637 may be easily removed from the device 1 for cleaning and/or replacement.

The front 4 of the portable stove 1 may have a height 11 (FIG. 2) defining the distance between the open top 2 and the bottom 3 of the portable stove 1 when the stove 1 is in a closed Second Position B. The height 11 of the front 4 of the portable stove 1 may be large enough so as to provide adequate surface area for a series of control knobs 450 (FIGS. 2 and 3) and for other components contained within the interior 10 of the device 1 or located on the front 4 of the device 1. The front 4 of the portable stove 1 may have a plurality of openings 20 (FIG. 6). The openings 20 may be largely circular in nature and may have a diameter 21.

To convert the portable stove 1 from the non-usable Second Position B into the usable First Position A, the user may first unsecure a latch 326 (FIG. 2) located on a front of a lid 325 of the portable stove 1. When the latch 326 is unsecured from a corresponding latch 327 (located on the front 4 of the device 1) the lid 325 may be moved into an upright position. More specifically, the lid 325 may be moved from a position substantially parallel to the open top 2 of the stove 1 into a position substantially perpendicular to the open top 2 of the stove 1. In the upright position, the lid 325 remains largely perpendicular with respect to the open top 2 so that any oils, grease or food articles which may splash off the portable stove 1 may be stopped by an underside 330 of the lid 325. Further, the lid 325 may protect the stove 1, and articles being cooked on the stove 1, from wind or other environmental elements.

Once the lid 325 is in the upright position, a first side windscreen 331 and a second side windscreen 332 may be rotated upward. In particular, the first side windscreen 331 and second side windscreen 332 may be then rotated from a position substantially parallel to the open top 2 of the portable stove 1 to a position substantially perpendicular with respect to the open top 2 of the portable stove 1. In this upright position, the first side windscreen 331 and second side windscreen 332 may further prevent oils, grease or food articles from splattering outside the cooking area. Further, the first side windscreen 331 and second side windscreen 332 may protect the stove 1, and articles being cooked on the stove 1, from wind or other environmental elements. Once the lid 325, first side windscreen 331 and second side windscreen 332 are rotated upward, the stove tray (or protective covering) 74 and burners 88 of the portable stove 1 are visible and the portable stove 1 is now in the usable First Position A.

Referring now to FIGS. 6 and 7, a regulator 100 for the portable stove 1 may be provided. In an embodiment, the portable stove 1 may have multiple regulators 100 located within the interior 10 of the portable stove 1. The figures illustrate two regulators 100 within the interior 10 of the stove 1; however, any number of regulators 100 may be used within the interior 10 of the stove 1. The regulators 100 of the present portable stove 1 may allow a user to independently regulate a plurality of burners 88 (FIG. 2) to have approximately 0-20 psi each. The plurality of burners 88 have a diameter 89 which is generally greater than the diameter of the opening of the stove tray 74 of the portable stove 1. Referring now to FIG. 9, in an embodiment, the regulators 100 may be located outside of the housing of the portable stove 1.

The regulators 100 of the portable stove 1 may regulate the amount of the pressurized gas 150 (FIG. 1) located in a containment 151 which reaches the burner 88 of the portable stove 1. In the present device 1, the pressurized gas 150 (usually propane) is allowed to move from the containment 151 to the regulator 100 as unregulated or regulated pressure wherein the pressure of the pressurized gas 150 is then controlled simultaneously by the independent regulators 100 located within the interior 10 of the portable stove 1.

The regulator 100 of the portable stove 1 is illustrated as cylindrical; however the regulator 100 may take any suitable shape. The regulator 100 may have a front 101 (FIG. 1), a back 102, a generally cylindrical exterior surface 103, a diameter 104 and an interior 105 (FIG. 7). The diameter 104 of the regulator 100 is less than the height 11 of the front 4 of the portable stove 1 so as the regulator 100 may fit within the interior 10 of the portable stove 1.

The regulator 100 may have a first opening 110, a second opening 111 and a third opening 113. The first opening 110 and the second opening 111 may be present on the generally cylindrical exterior surface 103 whereas the third opening 113 may be present on the front 101 of the regulator 100.

In an embodiment, the regulator 100 may be secured so that the generally cylindrical exterior surfaces 103 of the regulator 100 rest in a largely parallel orientation with respect to the top 2, bottom 3, first side 6 and second side 7 of the portable stove 1 while the front 101 and back 102 of the regulator 100 may rest largely parallel with respect to the front 4 and back 5 of the portable stove 1.

The first opening 110 of the regulator 100 may provide a channel 190 (FIG. 7) into the interior 105 of the regulator 100. Secured to the first opening 110, and creating an air-tight seal with respect to the same, may be a first tube 120 (FIG. 1). The first tube 120 may be metal so as to withstand high pressures. The first tube 120 may have an interior channel passage 121 (FIG. 7) wherein the pressurized gas 150 (such as propane) may pass through between the containment 151 and the regulator 100 (as described below). In an embodiment, the regulators 100 may be in mirror orientation with respect to each other within the interior 10 of the portable stove 1.

Secured to the second opening 111 of the regulator 100 may be a second tube 130. The first tube 120 and the second tube 130 may extend outward from the regulator 100 at approximately parallel positions with respect to one another and at substantially opposite locations (approximately 180 degrees) on the generally cylindrical exterior surface 103 of the regulator 100. Locating the first tube 120 and second tube 130 on the generally cylindrical exterior surface 103 (substantially opposite sides) as opposed to extending upward or downward (toward the top 2 or bottom 3 of the stove 1) from the regulator 100, allows the portable stove 1 to have a smaller height 11 and therefore provides for a thinner portable stove 1 which is easier to transport and/or store.

The second tube 130 may be also made from a metal so as to allow the pressurized gas 150, such as propane, to pass through. The second tube 130 may have a channel 183 (FIG. 7) which may allow the pressurized gas 150 to pass through the same. The second tube 130 may connect the regulator 100 to an opening 200 (FIG. 1) at the bottom 3 of the portable stove 1. The opening 200 at the bottom 3 of the portable stove 1 may be mechanically secured to a burner 88 (as described below). As the pressurized gas 150 passes from the regulator 100, through the second tube 130 to the opening 200, the pressurized gas 150 then passes upward to the burner 88 of the portable stove 1 wherein the burner 88 properly directs the movement of the pressurized gas 150.

Figure 4:
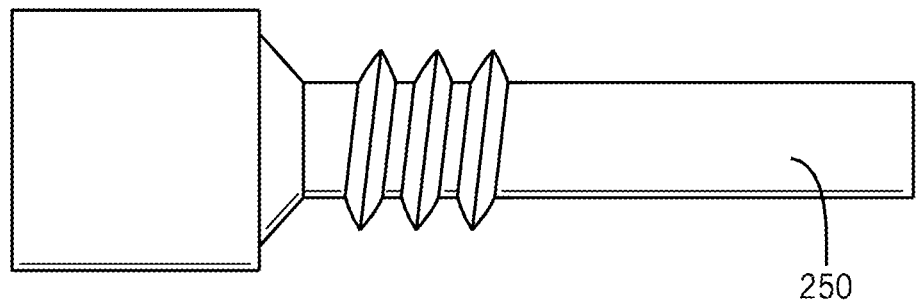
FIG. 4 illustrates a prior art rotating shaft of a regulator.

Unlike the prior art stem leads of regulators (FIG. 4), the regulator 100 of the present portable stove 1 may have a dual-lead stem 421 (FIG. 5) which is partially secured snugly within the interior 105 (FIG. 7) of the main body of the regulator 100 (at the front 101 of the regulator 100). In an embodiment, the dual-lead stem 421 may be made from high grade aluminum. The dual-lead stem 421 may rotate within the interior 105 of the regulator 100 and may control the amount of pressurized gas 150 which ultimately reaches each burner 88. The dual-lead stem 421 may be mechanically connected to the control knob 450 which in turn controls the burners 88. As a result of the dual-lead stem 421 of the regulator 100, only minimal turning of the control knob 450 is required to accurately control the amount of pressurized gas 150 reaching each of the burners 88. More specifically, because of the fast pitch of the dual-lead stem 421, only approximately a single three hundred and sixty degree turn of the control knob 450 is required to allow the regulator 100 to completely control the burner 88 (going from the lowest setting to the highest setting on a single turn).

Figure 5:
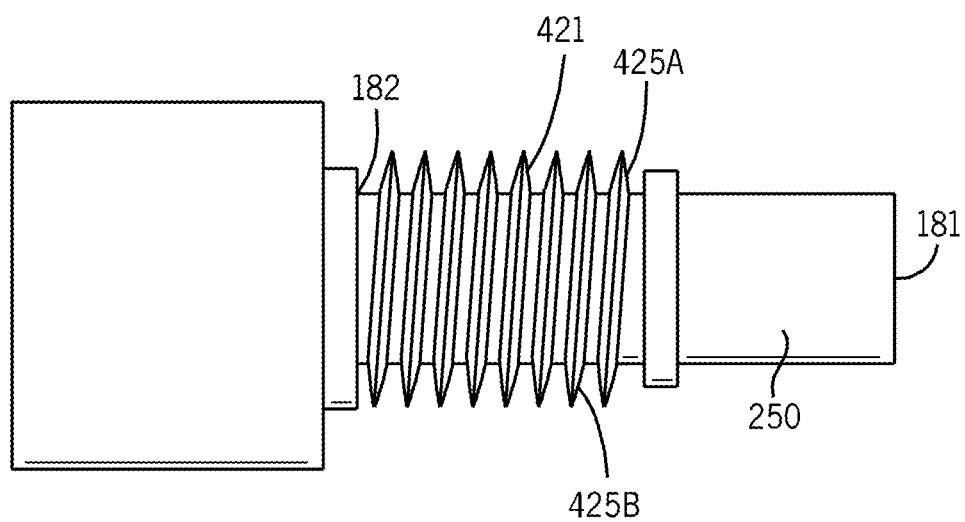
FIG. 5 illustrates the dual lead rotating shaft of the present regulator.

Referring now to FIG. 5, the present dual-lead thread 421 is further illustrated. The dual-lead thread 421 may have a first thread 425A and a second thread 425B. The start of the second thread 425B may be approximately one hundred and eighty degrees on the opposite side of the dual-lead thread 421 as the start of the first thread 425A. The first thread 425A and the second thread 425B work together to allow the smooth operation of the portable stove 1 with increased travel of the dual-lead thread 421 without producing an unsteady movement from side to side at the control knob 450.

Figure 8:
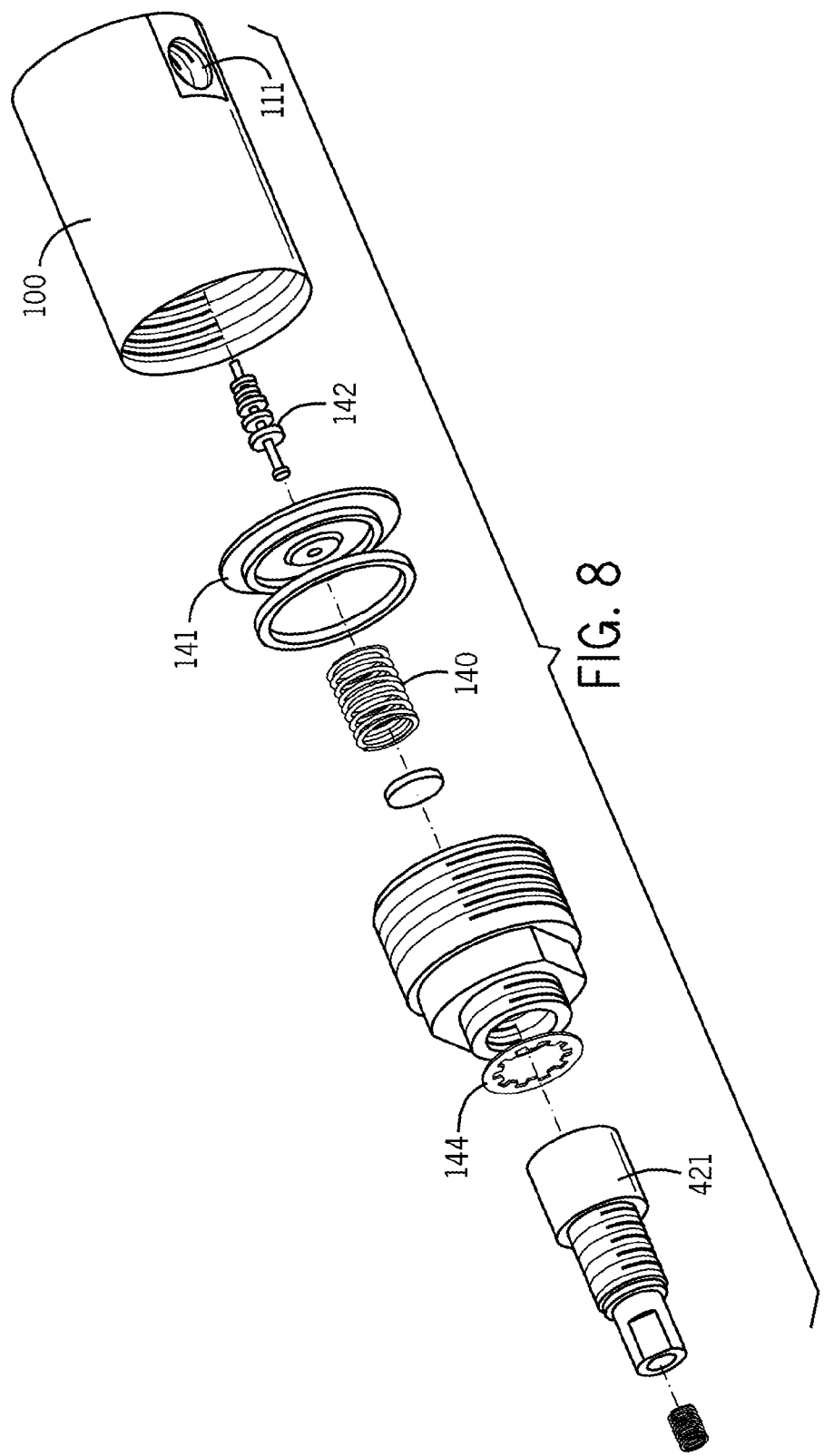
FIG. 8 illustrates an exploded view of the interior components of the regulator of the portable stove.

To activate the regulator 100, the control knob 450 is turned counter-clockwise as a result of the left-handed double lead thread of the stem within the regulator 100. It should be understood that the double thread could be manufactured in a reversed manner so as to turn the control knob 450 clockwise. The turning of the control knob 450 compresses a spring 140 (FIG. 8) located within the interior 105 of the regulator 100 against a diaphragm 141 which in turn forces a tire core valve 142 to open allowing the high pressure gas 150 to flow from the containment 151. The high pressure gas 150 then presses against the diaphragm 141 to overcome the force of the spring 140 and therein forces the tire core 142 closed. The more the control knob 450 is turned, the more the spring 140 is compressed and the higher the pressure of the pressurized gas 150 through the regulator 100. The regulator 100 is set to the maximum pressure when a dual lead stem 421 is turned and becomes immobile when it contacts the stop 144 (FIG. 8).

Figure 2:
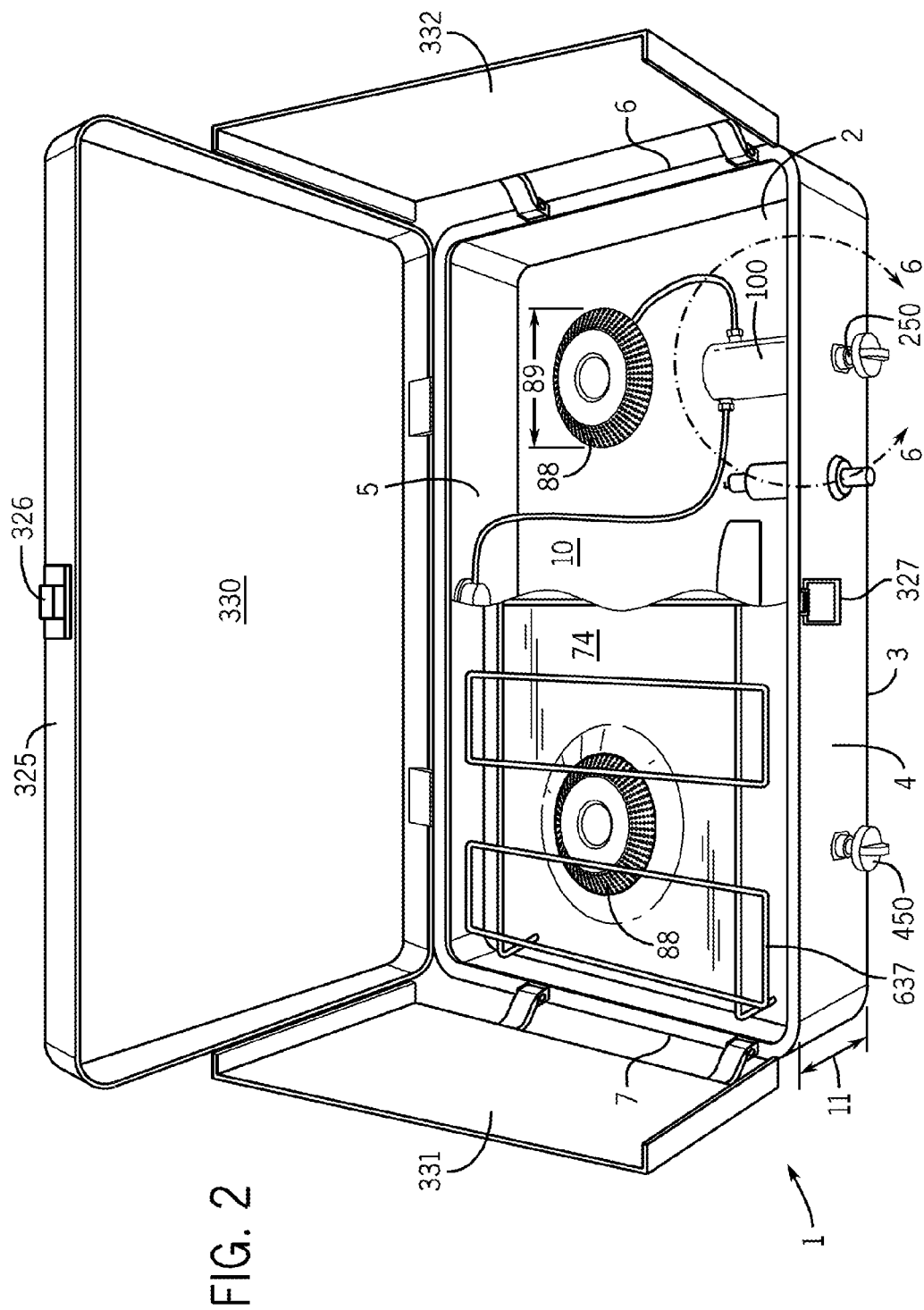
FIG. 2 illustrates a detailed view of the portable stove wherein a portion of the interior of the portable stove is visible.
Figure 3:
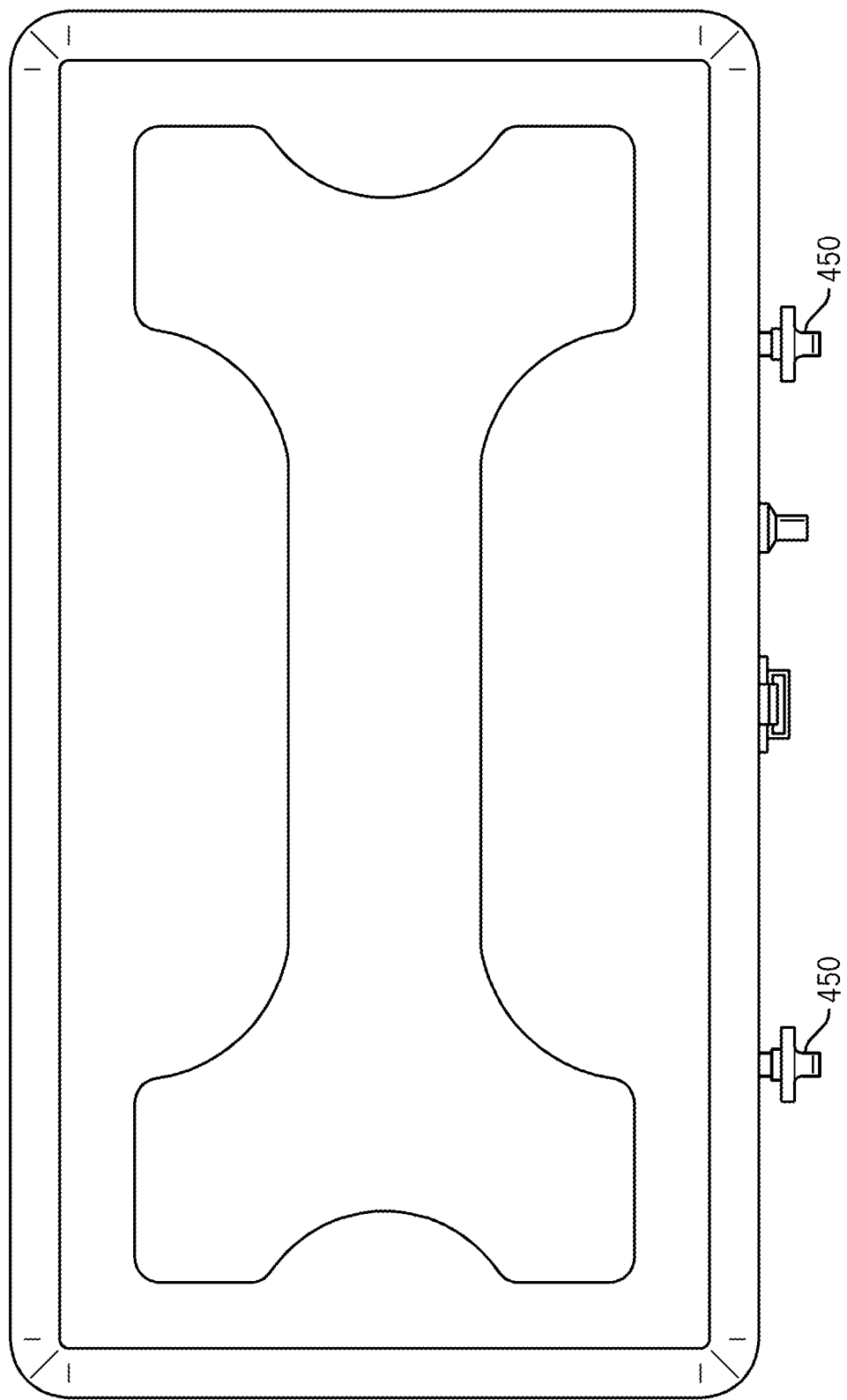
FIG. 3 illustrates a top view of the portable stove when the stove is in the non-functional position.

Referring now to FIG. 2, the control knob 450 may be secured to the portable stove 1. In an embodiment, the control knob 450 may be secured toward the front 4 of the portable stove 1. The control knob 450 may be generally circular in nature. The control knob 450 may be mechanically secured to the regulator 100 by means of a rotating shaft 250 which may pass through the opening 20 of the front 4 of the portable stove 1. The rotating shaft 250 may be connected to and part of the dual-lead stem 421 and may be slightly smaller than the opening 20 of the front 4 of the portable stove 1 such that little or no space may exist between the rotating shaft 250 and the circular interior wall of the opening 20. The rotating shaft 250 may have a first end 181 and a second end 182. The first end 181 may be secured to the control knob 450 while the second end 182 may be secured next to the regulator 100. The rotating shaft 250 may be smaller in diameter than the control knob 450 and the regulator 100 such that the rotating shaft 250 passes through the front 4 wall of the device 1, separating the control knob 450 from the regulator 100.

As stated above, in an embodiment, the portable stove 1 may have a plurality of control knobs 450 wherein each control knob 450 is secured to an independent regulator 100. The multiple control knobs 450 allow for the simultaneous control of the pressure and flow of the pressurized gas 150 to independent burners 88 as opposed to traditional camping stoves wherein an external regulator controls the pressure and a needle valve controls the flow for the pressurized gas 150. As a result, in the present portable stove 1 a user may control the pressure and flow of the pressurized gas 150 (such as propane) independently and may operate the portable stove 1 in a much more fuel-efficient manner because only the necessary amount of pressurized gas (or fuel) 150 needed is used. Further, as a result of being able to independently control the burners 88, a user may elect to cook, for example, eggs on hot on one burner 88 and may simmer coffee on another burner 88. The control knob 450 may allow the user to control the amount of the pressurized gas 150 may pass through to the burner 88. More specifically, a user may manipulate the control knobs 450 to control the amount of pressurized gas 150 exiting the regulator 100 and passing through to the second tubes 130 to the burners 88.

As stated above, in the embodiment with multiple regulators 100, there are multiple first tubes 120 (one for each regulator 100). The first tubes 120 may extend inward and merge at an inlet fitting 525 (FIG. 1). The pressurized gas 150 may enter the interior 10 of the portable stove 1 through an opening 300 on the back 5 of the portable stove 1. The inlet fitting 525 may be secured at the back 5 of the portable stove 1 such that all the pressurized gas 150 that passes through the interior 10 of the portable stove 1 passes through the inlet fitting 525 first, then the plurality of the first tubes 120, then to the regulators 100, then to the second tubes 130 and finally to the burners 88. The inlet fitting 525 may allow the pressurized gas 150 to split, allowing approximately equal pressure to all of the independent regulators 100. Securing the regulators 100 and the first tubes 120 and second tubes 130 within the interior 10 of the portable stove 1 may protect the regulators 100 and first tubes 120 and second tubes 130 from damage.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A portable stove comprising:
   a housing have an open top, a bottom, a front, a back, a first side, a second side and an interior;
   a first pressurized gas regulator having a housing having an interior channel wherein the first pressurized gas regulator is located completely within the interior of the housing of the portable stove;
   a second pressurized gas regulator having a housing having an interior channel wherein the second pressurized gas regulator is located completely within the interior of the housing of the portable stove and wherein the first pressurized gas regulator and the second pressurized gas regulator are mirror images of each other;
   a first burner secured to the bottom of the housing;
   a second burner secured to the bottom of the housing;
   a pressurized gas containment located outside of the housing of the portable stove wherein the pressurized gas containment holds a flammable pressurized gas;
   a first tube connecting the first pressurized gas regulator to the first burner wherein the flammable pressurized gas passes through the first pressurized gas regulator, through the first tube and through the first burner prior to the flammable pressurized gas being ignited
   a second tube connecting the second pressurized gas regulator to the second burner wherein the flammable pressurized gas passes through the second pressurized gas regulator, through the second tube and through the second burner prior to the flammable pressurized gas being ignited;
   a tube connecting the pressurized gas containment to a cylindrical inlet fitting wherein the cylindrical inlet fitting is located completely within the interior of the housing of the portable stove and wherein the cylindrical inlet fitting has two outlets located one hundred and eighty degrees from each other; and
   a first pipe connecting the inlet fitting to the first pressurized gas regulator and a second pipe connecting the inlet fitting to the second pressurized gas regulator wherein the first pipe and the second pipe are of the same length and mirror images of each other and therein equal pressure is provided to the first pressurized gas regulator and the second pressurized gas regulator.

2. The portable stove of claim 1 further comprising:
   a dual lead stem having a first end, a second end and a generally cylindrical exterior surface wherein the dual lead stem is partially secured within the interior channel of the first pressurized gas regulator wherein the dual lead stem has a plurality of independent threads which wrap around exterior surface and wherein the dual lead stem is rotated within the interior channel of the first pressurized gas regulator.

3. The portable stove of claim 2 further comprising:
a control knob secured to the second end of the dual lead stem wherein the control knob allows a user to control the movement of the dual lead stem with respect to the interior channel of the first pressurized gas regulator and therein allows a user to control the amount of flammable pressurized gas which reaches the first burner.

4. The portable stove of claim 1 further comprising:
a first side panel secured to the first side of the portable stove wherein the first side panel rotates from a first position substantially parallel to the bottom of the portable stove into a second position substantially perpendicular to the bottom of the portable stove and wherein the first side panel reduces the exposure of wind or other natural elements from contacting an item located on a grill of the portable stove.

5. The portable stove of claim 1 further comprising:
a lid secured to the back of the portable stove wherein the lid rotates from a first position substantially parallel to the bottom of the portable stove into a second position substantially perpendicular with respect to the bottom of the portable stove and wherein the lid reduces the exposure of wind or other natural elements from contacting an item located on a grill of the portable stove.

6. The portable stove of claim 5 further comprising:
a latch located on the lid wherein the latch is temporarily secured to a corresponding latch located on the front of the portable stove.

7. The portable stove of claim 1 further comprising:
an interior channel of the first pressurized gas regulator wherein the interior channel houses a spring, a diaphragm and a stop.

8. The portable stove of claim 1 wherein the flammable pressurized gas is propane.

\* \* \* \* \*